United States Patent
Swantner et al.

(10) Patent No.: US 9,281,087 B2
(45) Date of Patent: Mar. 8, 2016

(54) MOBILE BORATION SYSTEM

(71) Applicant: Westinghouse Electric Company LLC, Cranberry Township, PA (US)

(72) Inventors: Stephen R. Swantner, Pittsburgh, PA (US); Ryan T. Vanston, Pittsburgh, PA (US); Robert S. Fournier, West Hartford, CT (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 9 days.

(21) Appl. No.: 14/639,288

(22) Filed: Mar. 5, 2015

(65) Prior Publication Data

US 2015/0187448 A1    Jul. 2, 2015

Related U.S. Application Data

(63) Continuation-in-part of application No. 13/792,465, filed on Mar. 11, 2013.

(60) Provisional application No. 61/635,315, filed on Apr. 19, 2012.

(51) Int. Cl.
*G21C 9/033* (2006.01)
*G21C 15/18* (2006.01)
(Continued)

(52) U.S. Cl.
CPC ............... *G21C 15/182* (2013.01); *C02F 1/687* (2013.01); *G21C 9/033* (2013.01); *G21D 1/02* (2013.01);
(Continued)

(58) Field of Classification Search
CPC ........ G21C 15/182; G21C 9/033; G21D 1/02; G21D 3/04; Y02E 30/40; Y10T 137/2496
USPC .................. 376/282, 909; 137/87.01
See application file for complete search history.

(56) References Cited

U.S. PATENT DOCUMENTS 4,225,390 A * 9/1980 Brown ..................... G21C 7/22
376/328
4,595,555 A * 6/1986 Orii ......................... G21C 9/012
376/282

(Continued)

FOREIGN PATENT DOCUMENTS

CA    1136778    * 11/1982   ............. G21D 3/04

OTHER PUBLICATIONS

Hodge et al. "Identification and Assessment of BWR In-Vessel Severe Accident Mitigation Strategies". Oak Ridge National Laboratory. Oct. 1992. Retrieved from the Internet. <URL: http://web.ornl.gov/info/reports/1992/3445603689514.pdf> entire document.

(Continued)

*Primary Examiner* — Jack W Keith
*Assistant Examiner* — Daniel Wasil
(74) *Attorney, Agent, or Firm* — Richard J. Coldren; Westinghouse Electric Company LLC

(57) ABSTRACT

A mobile boration system (60) has a number of components that are mobile and include a water source (10), $H_2BO_3$ powder supply (14), a mixer to mix the solution (20) capable of providing a boric acid solution (30) with minimal air entrainment and optional heat exchanger(s) (12), and wherein the system (60) is capable of transport to a nuclear power plant facility by land, sea or air, rather than being in place in a large vulnerable footprint.

14 Claims, 6 Drawing Sheets

(51) Int. Cl.
*G21D 1/02* (2006.01)
*G21D 3/04* (2006.01)
*C02F 1/68* (2006.01)
*C02F 103/02* (2006.01)

(52) U.S. Cl.
CPC .............. *G21D 3/04* (2013.01); *C02F 2103/02* (2013.01); *C02F 2201/008* (2013.01); *Y02E 30/40* (2013.01); *Y10T 137/2496* (2015.04)

(56) References Cited

U.S. PATENT DOCUMENTS

| | | | | |
|---|---|---|---|---|
| 4,764,337 | A | | 8/1988 | Panson |
| 5,171,515 | A | | 12/1992 | Panson et al. |
| 5,327,703 | A | * | 7/1994 | Cur ...................... B65B 31/024 |
| | | | | 53/440 |
| 8,233,581 | B2 | | 7/2012 | Connor et al. |
| 2005/0242029 | A1 | * | 11/2005 | Sava ........................ C02F 1/50 |
| | | | | 210/632 |
| 2010/0239062 | A1 | * | 9/2010 | Yeon ...................... G21C 15/18 |
| | | | | 376/282 |
| 2010/0272226 | A1 | * | 10/2010 | Kojima .................. G21C 15/18 |
| | | | | 376/282 |
| 2013/0121454 | A1 | * | 5/2013 | Newton ............... G21C 15/182 |
| | | | | 376/299 |
| 2013/0170599 | A1 | * | 7/2013 | Muller ................. G21C 15/182 |
| | | | | 376/282 |

OTHER PUBLICATIONS

Green. "The Radiological and Environmental Impact of Nuclear Accidents—a Case Study of Japan's Fukushima Daiichi Nuclear Power Plant". University of Surrey. Sep. 2011. Retrieved from the Internet. <URL:http://personal.ph.surrey.ac.uk/-phs 1 pr/msc_dissertations/msc-diss-2011/Hannah-Green-Dissertation-fukushima.pdf> entire document.

Brown et al. "Slurry and Air Do Mix: Interim Results of WFGD Absorber Slurry Aeration Studies". Babcock & Wilcox Power Generation Group. 2008. Retrieved from the Internet. <URL:http://www.babcok.com/library/pdf/BR-1816.pdf>. entire document.

Westinghouse Electric Company LLC, PCT/US2013/036852, International Search Report, Sep. 18, 2013, 3 pages.

* cited by examiner

MOBILE BORATION SYSTEM

CROSS REFERENCE TO RELATED APPLICATION

This application is a continuation-in-part application of and claims priority to U.S. Traditional patent application Ser. No. 13/792,465, filed Mar. 11, 2013 entitled, MOBILE BORATION SYSTEM, which application claims priority to U.S. Provisional Application Ser. No. 61/635,315, filed Apr. 19, 2012, entitled "Mobile Boration System."

BACKGROUND

1. Field

This invention relates to supplying borated water to commercial nuclear power plants.

2. Description of Related Art

Commercial nuclear power plant operators are exploring solutions to eliminate and/or mitigate damages caused by natural and/or man-made disasters, such as the tsunami that recently damaged the Fukushima nuclear power plant in Japan, including not only the reactors but many other supply systems permanently built on-site, with a substantial footprint. One system that is being examined is the water supply system. The boration of supply water is usually considered necessary to provide a neutron poison liquid to help maintain the reactor subcritical.

Use of boric acid solutions in nuclear reactors is taught early on, for example, by Panson in U.S. Pat. No. 4,764,337, which states that:

the use of boric acid for preventing or at least inhibiting carbon steel corrosion in the secondary water systems of nuclear steam generators has been known for some time. In particular, boric acid has been utilized to minimize the phenomena known as denting at the tube/-tube support plate interface in nuclear steam generators . . . . While boric acid alone has been found to be highly useful for inhibiting carbon steel corrosion of the type which results in denting, nuclear applications require a continuous search for improved systems and increased reliabilities. Diol boric acid compounds which are more strongly acidic than boric acid alone are known . . . . [There appears to be a] reaction between boric acid and diol compounds to activate boric acid by producing diol boric acid complexes which have more acidic characteristics than does boric acid itself. However there is no suggestion . . . that such diol boric acid complexes are capable of inhibiting corrosion. And even more so there is no disclosure that diol boric acid complexes might be useful for inhibiting carbon steel corrosion in nuclear steam generator applications.

Importantly, it was later found that boric acid can be used as a moderator to suppress some neutron flux, as taught by U.S. Pat. Nos. 8,233,581 and 5,171,515 (Connor et al. and Panson et al., respectively). In another area, Brown et al., in U.S. Pat. No. 4,225,390 shows the level of complexity for boron control systems for nuclear power plants.

Boration supply systems currently in operation utilize a completely on-site, permanent batching tank of substantial size, requiring major auxiliaries to keep it "on-site useful," to blend the desired concentration of boric acid and water to provide an appropriate solution prior to injection into the coolant water used within the reactor coolant system of a nuclear reactor.

The major disadvantage of current boration supply systems is that they require a very large permanent batching tank with attached components including a permanent motorized agitator and a heating system for mixing and maintaining relatively high concentrations of boric acid in solution. As such, current boration supply systems are a problem in that they require a large amount of space, that is, a large footprint, and a major amount of power. These requirements do not make the current boration supply systems readily transportable or mobile, and are permanently on-site. Thus, there is a need to mimic nuclear power plant boration systems with a system that provides a smaller in-place footprint, is easily transportable, and makes more efficient use of energy and resources during periods of time when the installed plant equipment is not operable or is not ready for use.

SUMMARY

The above problems are solved and needs supplied by providing a mobile boration apparatus providing nuclear reactor systems with borated coolant that can mix constituents on-site, to provide borated water. The mobile apparatus comprises a mobile transportation means having: a connection to a water source; an $H_2BO_3$ powder or other water soluble boron source; a heater to heat the water; a pump or other motive force to move water to a desired location; a mixer to allow metered mixing of the water and $H_2BO_3$ powder or other water soluble boron source to generate a preselected, metered appropriate concentration of initial water/boric acid slurry, which slurry during continued mixing provides a borated/boric acid water solution; a dilution tank; a hot stream conduit connected between the mixer and the dilution tank for conveying the relatively hot borated/boric acid water solution to the dilution tank; a dilution stream conduit connecting the dilution tank to a dilution stream compared to the relatively hot borated/boric acid water solution; and a diluted boric acid output connected to an exit port on the dilution tank for conveying a mixture of the dilution stream and the hot borated/boric acid water solution to a nuclear reactor system at a desired concentration and flow rate.

In one embodiment the heater heats the water/boric acid slurry in the mixer. Preferably the pump is selected from the group consisting of a positive displacement pump and a centrifugal pump with a flow meter and the $H_2BO_3$ powder source is a hopper and a screw feed conveyor. Desirably, the hopper and the screw feed conveyor can provide a controlled volume or mass flow of $H_2BO_3$ powder and the mixer is a mechanical mixer which can provide sufficient agitation to ensure the slurry goes into solution and air entrainment is less than 1 volume %, while the mixer is maintained at atmospheric pressure.

In another embodiment the mobile transportation system is selected from one of a truck trailer, a railcar flatbed, sea transport or air transport. Preferably, the mobile boration apparatus includes a tank containing a chemical additive for facilitating dissolution of the $H_2BO_3$ powder in the water.

In still another embodiment the mixer and a substantial length of the hot stream conduit is maintained in an insulated chamber and the dilution tank is situated outside the chamber. Preferably, the mobile boration apparatus includes a compressor connected to the dilution tank to supply compressed air to the upper interior of the dilution tank and, desirably, the compressor is also connected to the $H_2BO_3$ powder delivery system to provide an air blanket to prevent powder agglomeration caused by moisture migration to the interface between the powder source and the mixer. The mobile boration apparatus also includes a control system which is responsive to an operator input of set points to automatically control a concentration of boric acid exiting the dilution tank.

A continuous flow apparatus transportable by road, rail or sea can provide an auxiliary supply mechanism without building a massive series of structures next to the nuclear facility which would be subject to a wide variety of catastrophic events.

BRIEF DESCRIPTION OF THE DRAWINGS

In order to better understand the invention more clearly, convenient embodiments will now be described, by way of example with reference to the accompanying drawings in which.

DESCRIPTION OF THE PREFERRED EMBODIMENT

The boration supply system according to the present invention overcomes the limitations of current systems and provides a solution for eliminating and/or mitigating damages to a commercial nuclear power plant boration supply and storage system. According to one embodiment of the present invention, a mobile boration supply system is provided capable, for example, to refill the refueling water storage tank. This system must be easily stored and transportable. Because of its mobility by sea, land or air transport, the boration supply system of the present invention is capable of being centrally deployed and transportable to any nearby site that may require boration. This is a vast improvement over the design characteristics of prior art boration supply systems employed to batch boric acid in power plants. The boration supply system of the present invention is designed to use a minimum number of required pieces of equipment, one or more of which are selected for minimal size and power consumption requirements. As such, the system is ideal for mobile applications via truck, train or sea. The relative small size of the system also makes it suitable to other possible permanent applications.

Figure 1:
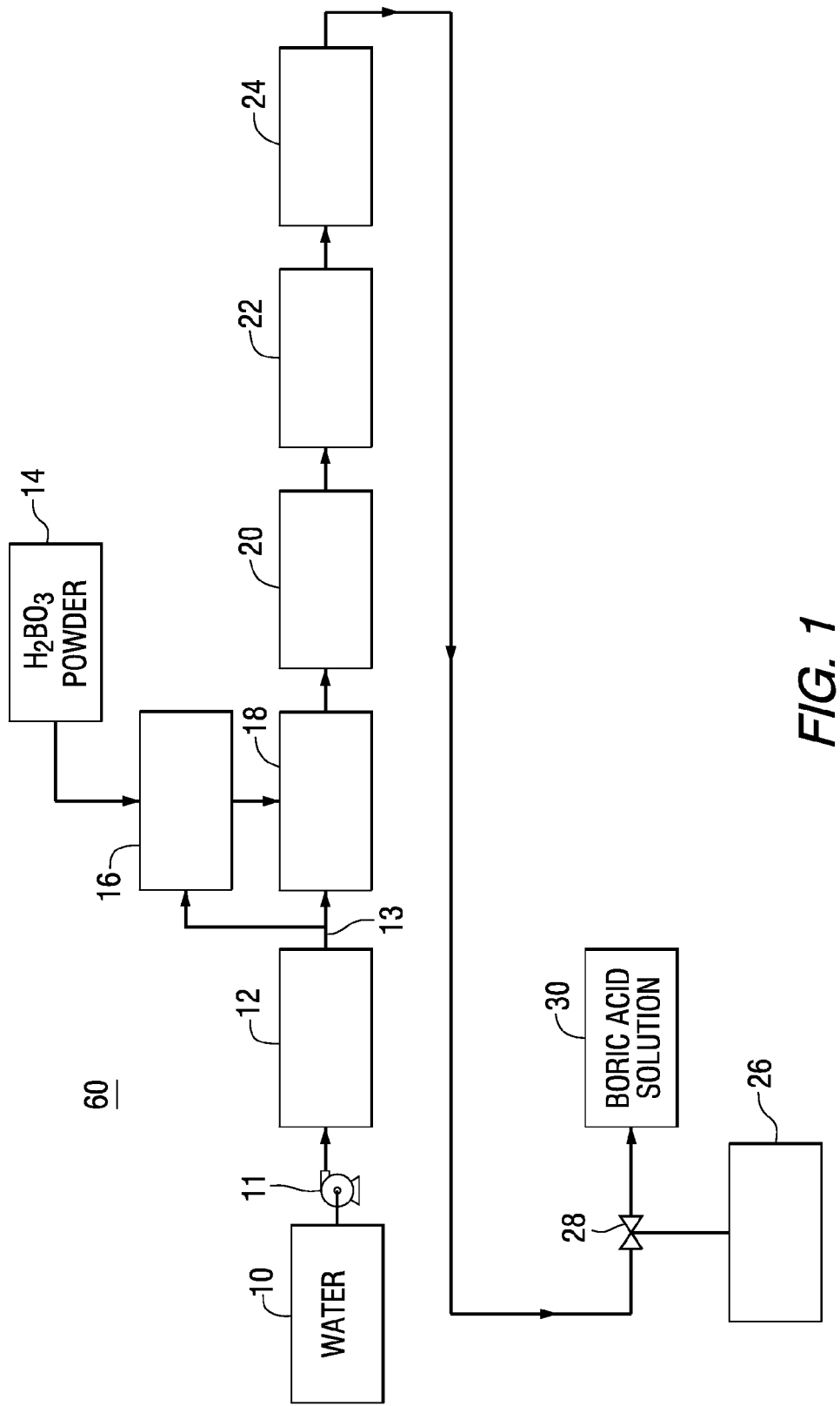
FIG. 1 is a block diagram of one embodiment of the of the mobile boration system of this invention.

FIG. 1 illustrates a boration supply system 60 according to one embodiment of the present invention. As seen in FIG. 1, the system includes: a water pump 11, such as a positive displacement pump or centrifugal pump, with a flow control device 12 to provide a metered source of fluid 13; a slurry funnel 16 and eductor system 18 with a screw feed hopper 14 to directly handle powdered boric acid and eliminate the need for large batching tanks; and a mechanical mixing device 20 to allow sufficient time and provide sufficient mechanical agitation to ensure boric acid goes into solution. In the current embodiment, the mechanical mixing device 20 reduces the possibility of entraining air, less than 1 vol. %, in the downstream flow, which would be undesirable. The mechanical mixing device can incorporate an optional upstream orifice/valve to tune the flow distribution. A metering screw takes the $H_2BO_3$ powder, or other source of boron that is water soluble, from the hopper and can provide a controlled volume flow with a relatively high accuracy (0.5%). The mixing device may also incorporate a "screw speed to ppm" correlation if possible. In the current embodiment, the mass flow rate of the $H_2BO_3$ powder is about 23 lb/min.

In other embodiments, the boration supply system 60 of the present invention can incorporate an optional heater 41 and chemical additive tank to provide the required solvent temperature and chemistry to facilitate driving boric acid into solution.

As shown in FIG. 1 (and FIG. 2), an optional water source 10 (32), which may be outside the boundary of the device if a local water source is available, is pumped, by optional pump 11 (34), into a heat exchanger 12 (41). The heated water 13 (45) is passed to a wash-down funnel 16 or the like 42 and metered with feed granular $H_2BO_3$ powder 14(36) to provide an aqueous $H_2BO_3$ slurry 36'. Pump 11 may not be needed if there is a pump near a water source, i.e., municipal water supply, river, lake, etc. This slurry 36' is fed into an eductor 18, or similar device, which draws the slurry by use of a pressure differential, plus additional heated water 13 which is mixed to provide a homogeneous slurry and further heated in mixing device 20 (44). Boron concentration is checked on detector 22 to provide a desired boron concentration solution. Flow element 24 meters flow rate of the solution. Some sludge slurry can be passed to collector 26 (36') via valve 28 and finally to optional hold-up feed tank 30 (50) for the reactor. It may be pumped directly into the nuclear system.

Figure 2:
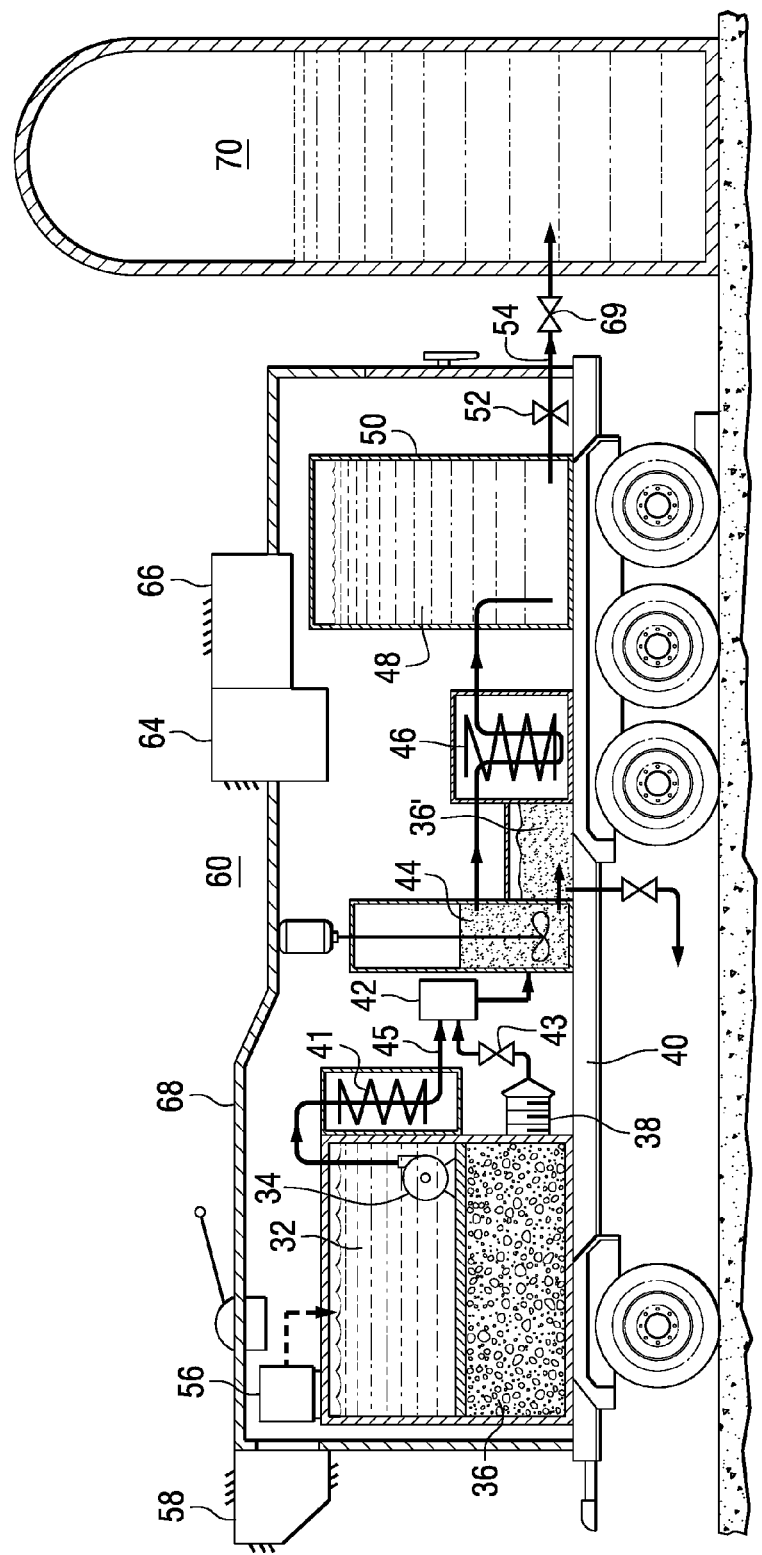
FIG. 2 is a schematic diagram of a mobile flatbed truck transporter carrying the appropriate equipment components set out in FIG. 1, to provide a mobile boric acid solution platform which can be driven directly into the nuclear complex for delivery of the boric acid solution to one of a plurality of optional stationary water tanks, the combination of which provides a minor footprint on the nuclear plant facility.

FIG. 2, based completely on FIG. 1, shows a possible delivery platform such as a truck flatbed, or other transportation means 40, such as a railroad car. The transport 40 can contain a water tank 32, granular powder tank/supply 36, screw powder feed 38, water pump 34, water heater 41, water metering system 42, valve 43, mixer 44, waste water slurry tank 36' and high aqueous slurry heater 46, to provide boric acid solution 48 fed into optional storage tank 50 and through valve 52 to boric acid feed 54 through valve 69. This feed 54 flows into optional minimal storage tank 70. Optional additive tank is shown as 56. Also shown is an optional heater/air conditioner unit 58, power control function system 66 and additional monitors 64 as well as a truck cover structure 68.

Figure 3:
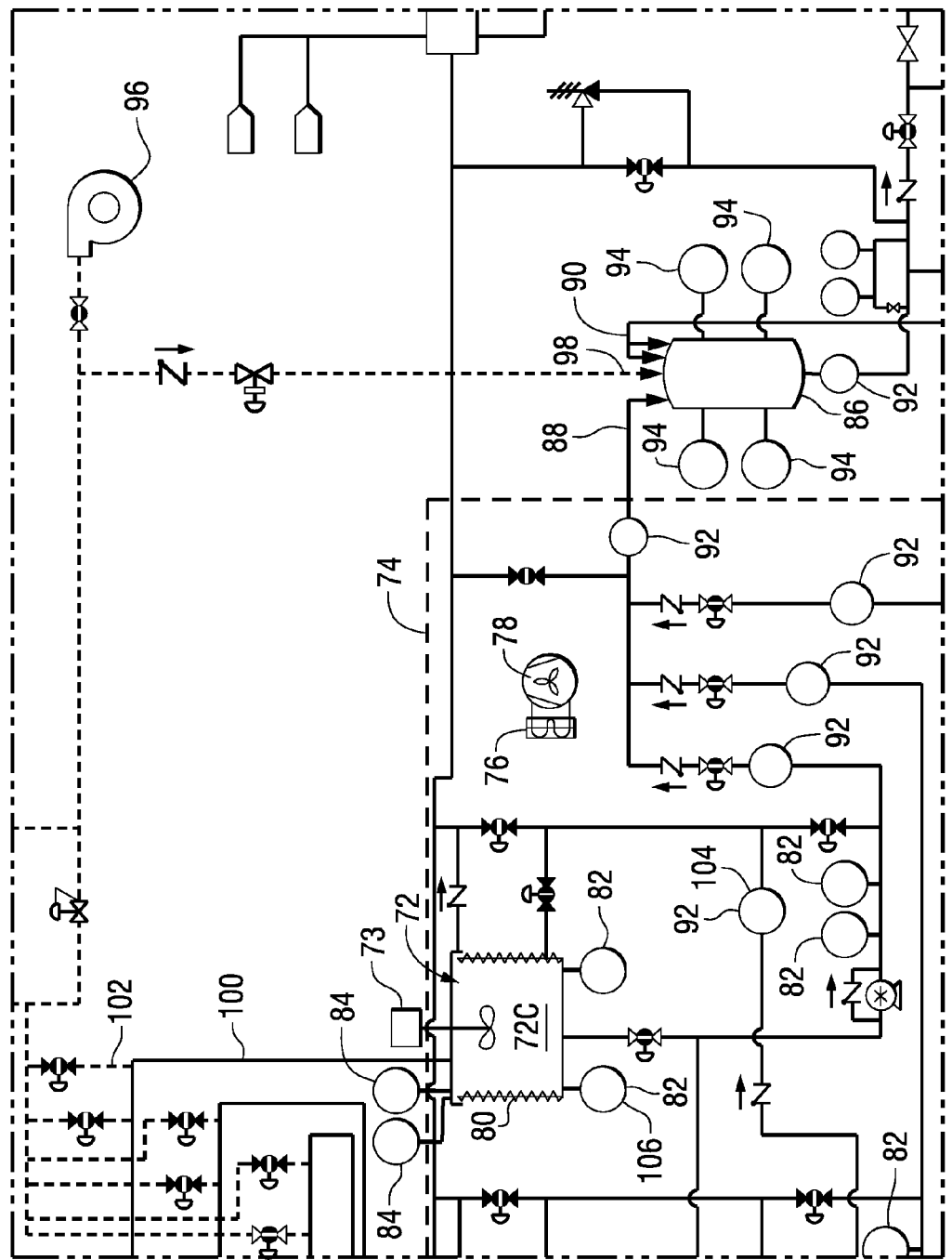
FIG. 3 is a partial system schematic diagram of a dissolution tank and associated hot stream components of another embodiment of this invention, showing the insulated chamber boundary of this embodiment.

FIG. 3 shows a further enhancement of a portion of the system illustrated in FIGS. 1 and 2. The enhanced system shown in FIG. 3 includes an insulated chamber, shown by the dashed line 74, that contains one or more dissolution tanks (previously described as the mixer 44 in regard to FIG. 2) in which high temperature dissolution of boric acid power in water occurs. The dissolution tank 72 preferably has a mechanical mixer 73 that can provide sufficient agitation to ensure the slurry goes into solution and air entrainment of less than 1 volume %. The dissolution tank 72C shown in FIG. 3 is part of three parallel trains shown in FIGS. 4 and 5, for processing powdered $H_2BO_3$ into boric acid having the desired concentration. Multiple trains are used to achieve the desired volume output while enabling the portability of the system and improved efficiency of the process. The dissolution tanks are surrounded by a heater 80 and monitored by pressure sensors 82 and temperature sensors 84. Because the dissolution tank 72 and associated equipment are required to be operated at a high temperature to prevent boric acid from precipitating from the contained fluid, the chamber 74 is operated at a high temperature regulated by the heater 76 and blower 78. Operating the entire insulated chamber 74 at a high temperature is advantageous because otherwise localized heating would be required at a number of points in the system with a higher probability of introducing a failure mechanism.

As mentioned in the previous paragraph, the dissolution tank 72 is where high temperature dissolution of boric acid in water occurs. Because the fluid is of a high temperature, evaporation will occur and can potentially impact the addition pathway 100 of solid powders. This embodiment incorporates an air blanket to prevent powder agglomeration caused by moisture migration to the interface between the powder handling equipment and the dissolution tank. The compressed air is supplied by the compressor 96 and enters the powder pathway 100 at the interface 102. The design of the dissolution tank incorporates a directed flow field which allows retaining an atmospheric pressure in the presence of air injection which relaxes tank structural requirements. This is accomplished through a combination of having a closed tank with a single vent line and check valve 120 which allows for an atmospheric condition while preventing powder agglomeration. Maintaining the tank at atmospheric pressure limits the tank wall thickness requirement which facilitates heat transfer from the band heaters 80 into the interior of the dissolution tanks 72.

The enhanced system illustrated in FIG. 3 includes the dilution tank 86 outside of outside of the insulated chamber. The dilution tank is where two streams, one of high temperature, highly concentrated fluid, is combined with the lower temperature, dilute stream. The high temperature stream enters the dilution tank 86 at inlet 88 and the lower temperature stream enters at inlet 90. Because the direct interaction of the two streams before they enter the bulk solution in the lower portion of the dilution tank 86 would create a thermal gradient that can lower the temperature of the highly concentrated line to a point where dissolution occurs and line blockage can result. Interaction of the two streams within the bulk solution does not create precipitation problem. To avoid the direct interaction of the two streams at the inlet a pressurized air region is formed at the top of the dilution tank that is maintained by the compressor 96 through air inlet 98. This separates the two injection steams from interacting thermally when they first enter the dissolution tank 86. The compressed air also provides a motive force to discharge the tank contents through the bottom of the tank to a desired location. The design of the dilution tank includes features to preclude excess air entrainment that occurs as the streams pass through the compressed air blanket, which relaxes air compressor sizing requirements. These features include: employing a tall, thin tank to limit vertical entrainment of air out through the tank exit; employing injection nozzles for the higher flow diluted stream to further prevent air entrainment; employing a stream diversion plate to minimize air entrainment; and angling the injection nozzles at about 30° in opposite directions to further reduce vertical air entrainment. The latter arrangement will counterbalance some of the forces on the injection nozzle. It should be appreciated that not all of these features need to be employed together to reduce air entrainment.

Thus this system includes a high temperature source within the dissolution tank 72 and a dilution stream, which mix in the dilution tank 86. The concentration within the dissolution tanks, and the two flow streams to the dilution tank 88 and 90 are variable and can be optimized based on user input. Appropriate measurements such as liquid flow rate, powder flow rate and dissolution tank level 94 provide input to the process optimization determination.

The liquid volume in the dissolution tanks 72 is indicated by a totalizer measurement on the heated flow stream 88. The totalizer measurement is provided by the flow sensors 92 designated by reference character 104 in combination with the pressure transducers 82 in the dissolution tanks 72, designated by reference character 106. The totalizer flow measurement must be corrected for the thermal conditions of the fluid as well as the quantity of powder added to the tank. The pressure transducer 106 must be corrected for the density of the solution. Once these corrections are applied the two parameters will match within the uncertainty of the measurement so long as the quantities of boric acid, lithium hydroxide and water have been added as expected. The lithium hydroxide is added to facilitate the dissolution of the $H_2BO_3$ powder. A programmable logic controller controls this process and includes logic to correct for density in real time. Deviations in these parameters outside of the uncertainty limits indicate a potential deviation in the target boron concentration. This process measurement is used to ensure delivery of the desired concentration of borated coolant. Based on user input of flow rate and concentration, an optimal high concentration target within the dissolution tanks 72 can be achieved to minimize the interfacing constraints such as energy usage, insulated chamber heat losses and dissolution tank pump net positive suction head margin.

Figure 4:
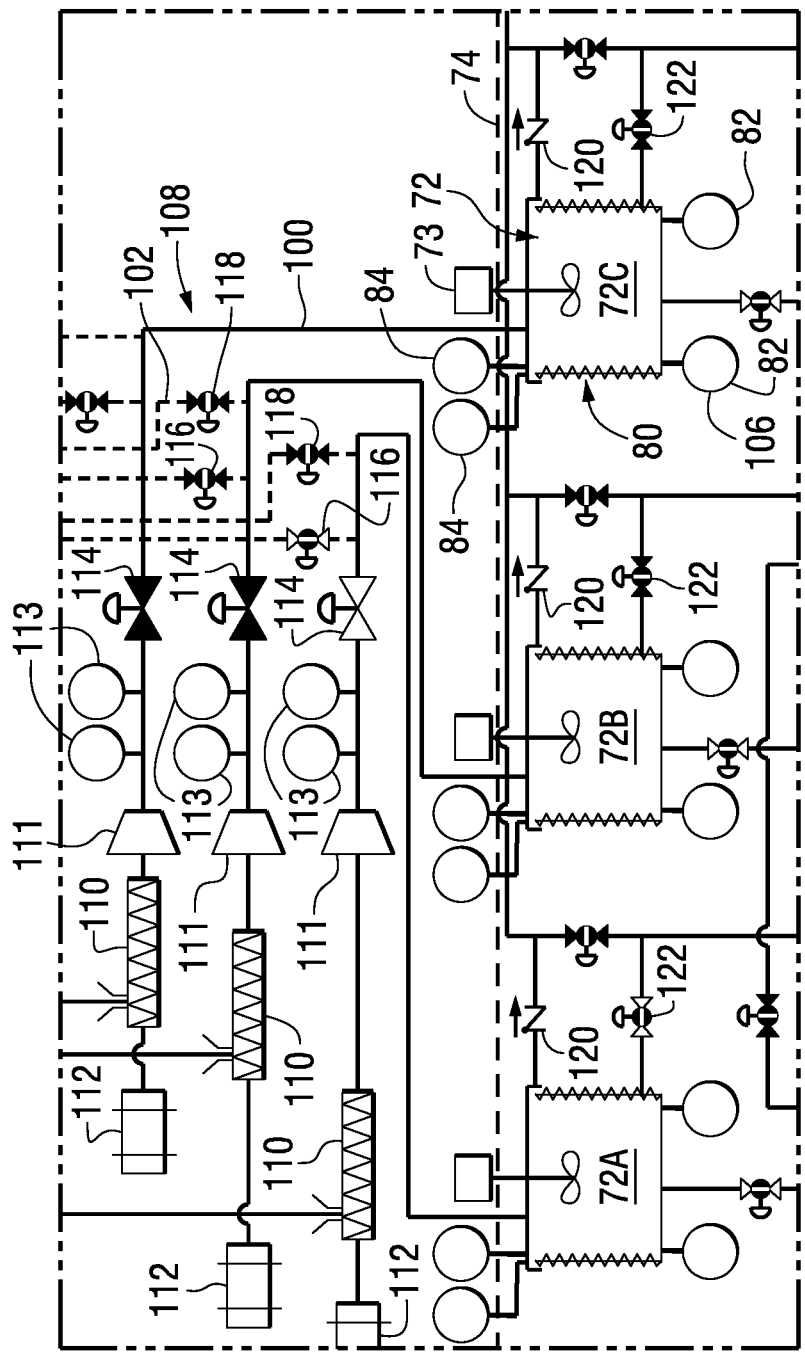
FIG. 4 is an expanded system view of the insulated chamber housing the dissolution tank illustrated in FIG. 3, showing three such tanks and associated hot streams connected in parallel.

FIG. 4 is a schematic system diagram that shows the respective $H_2BO_3$ feed circuits 108 connected to their corresponding dissolution tanks 72. The tops of the dissolution tanks 72 are provided with the $H_2BO_3$ powder from metering screw conveyors 110 using screw conveyor motors 112 through concentric reducers 111 and powder isolation gate valves 114. Powder level indicators 113 determine the presence of powder. The concentric reducers 111 are employed to distribute any powder sheer stresses equally and aid in powder movement. Once powder is added to the dissolution tanks 72A, 72B, 72C through addition line 100, powder isolation gate valves 114 are closed and air blanket isolation valves 116 or 118 are opened to provide the air flow. Isolation valves 116 and 118 connect the air compressor 96 (shown in FIGS. 3 and 5, with the powder feed lines and provide an air blanket to the dissolution tanks 72. Check valve 120 is a tank overfill conduit that provides the vent path for the air blanket to maintain pressure in the dissolution tank at or near atmospheric. Valve 122 is the dissolution tank inlet valve.

Figure 5:
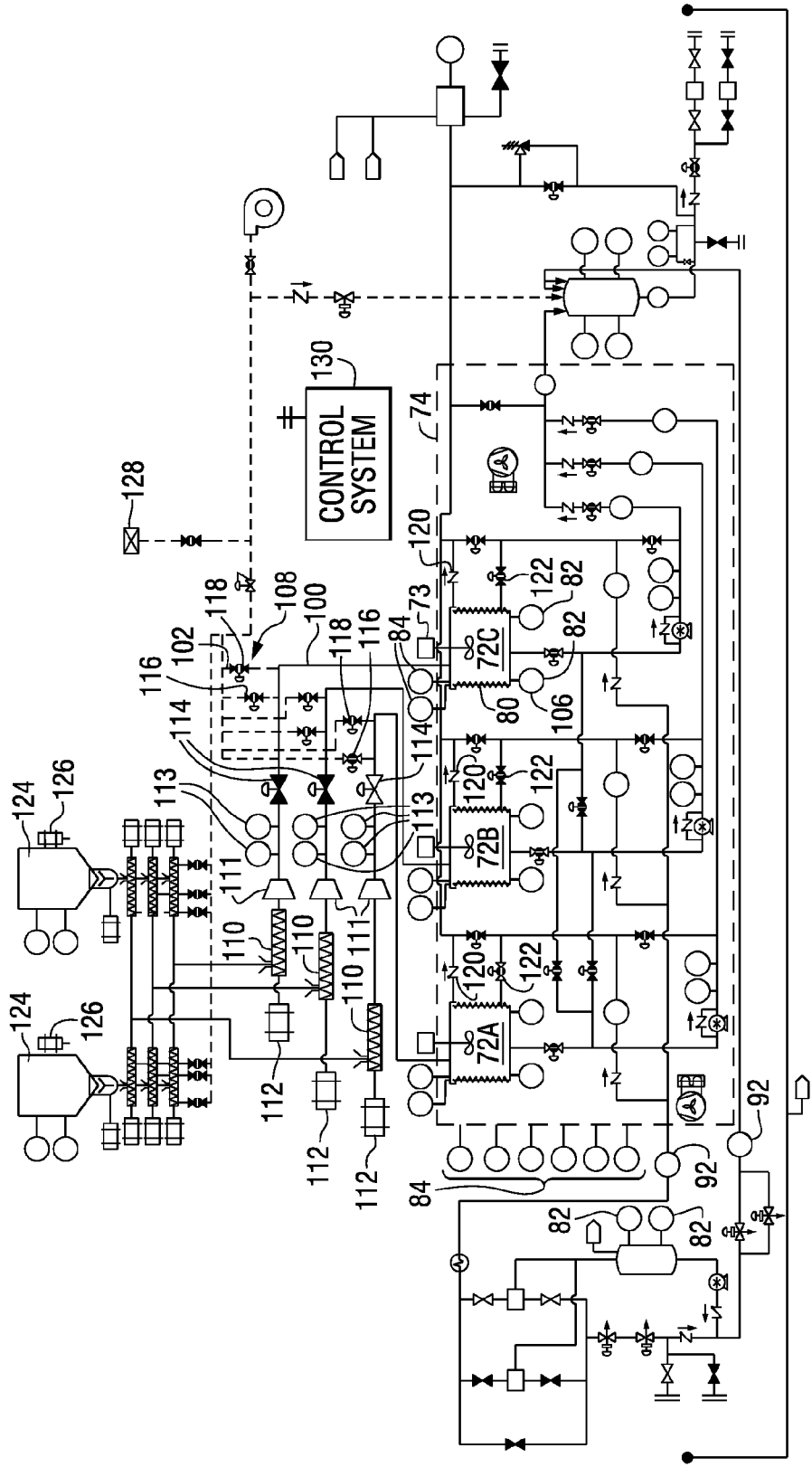
FIG. 5 is a full system schematic diagram of the embodiment shown in FIGS. 3 and 4.

FIG. 5 is a combination of FIGS. 3 and 4 and further show the hoppers with mechanical agitation 124 that feed the powder to the screw conveyors 110, with the vibrators 126 aiding movement of the powder. FIG. 5 also shows a backup air connection 128 and other auxiliary equipment.

Figure 6:
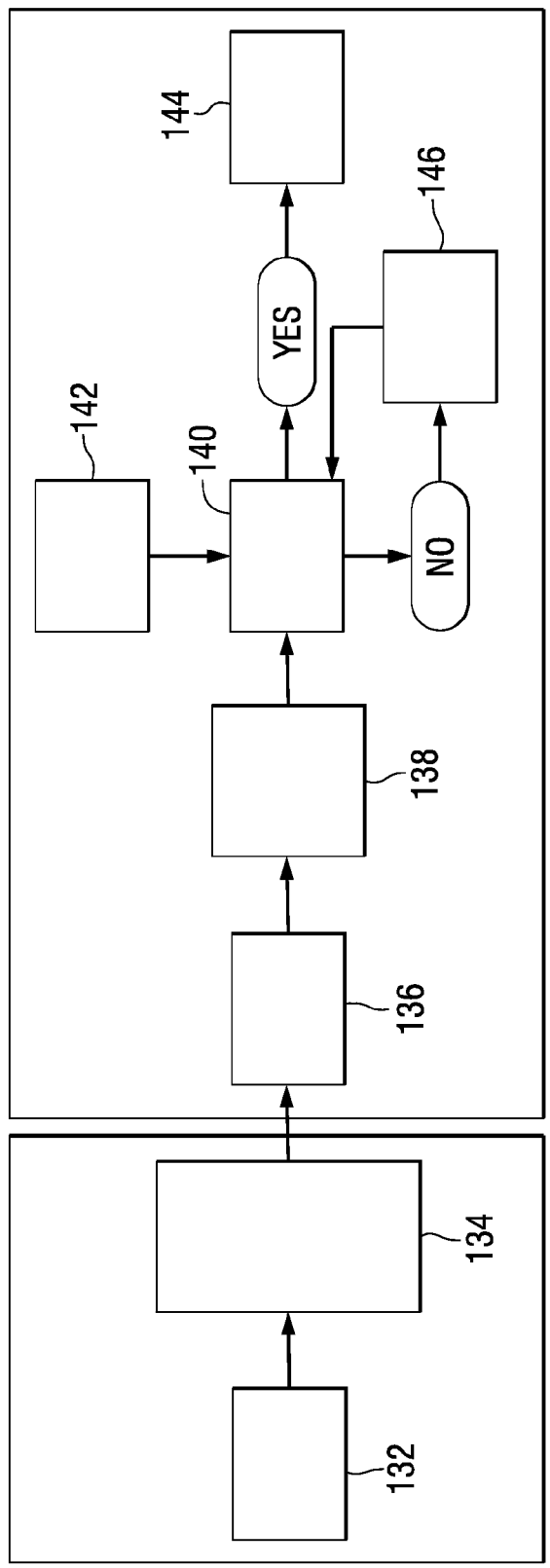
FIG. 6 is a system flow diagram providing an overview of the operation of the control system that controls the process performed by the system schematically illustrated in FIG. 5.

The embodiment illustrated in FIGS. 3, 4 and 5 also incorporates a logic controller 130 which contains control calculations and set point information based on physical phenomena and system arrangement. The logic controller receives input from a user, and manipulates the equipment to provide a desired product. Unique system logic includes: selection of the startup process based on user input, control valve position and control based on user input and skid condition; selection of an optimal dissolution tank concentration set point; control of powder injection by metering screw conveyor control; control of pump flow rate based on user input and skid condition; control of isolation valves and equipment based on process cycling; and control of dilution tank pressure based on instrument feedback. User input defines the initial control targets. For example, if it is known that a higher boron concentration discharge is required, the dilution tank concentration set point is then known and the control valve positions can be assumed. The operator can determine initial control valve positions instead of the control system to reduce the likelihood of error. The system control logic also includes the ability to determine the optimized tank concentration to relax constraints on the interfacing parameters. FIG. 6 is a flow chart overview of the control system. Initial user input, e.g., flow rate, concentration, operating alignment, is entered at 132 and the initial targets, e.g., valve positions, flow rate targets, dissolution tank boric acid concentration, dissolution tank boric acid temperature, screw conveyor targets, are determined at 134. The dissolution tank then fills at 136 with powder and water. Input is then received at block 138 from the instrumentation, e.g., flow meters, pressure sensors and temperature sensors and the sensor outputs are used at block 140 to determine if the concentration in the dissolution tank is on target. To make that determination block 142 provides block 140 with boric acid and temperature density correlations (based on testing data). If the concentration is on target then the system identifies at block 144 that the solution is ready for discharge. If block 140 determines that that the concentration is not on target then block 146 makes the appropriate adjustments and the determination is repeated in block 140 until the target is reached.

The versatility of this supply means, in providing a semi-constant supply of transported borated water, is not only vastly safer but financially sounder than vulnerable on-site storage.

While the invention has been described in terms of preferred embodiment, various changes, additions and modifications may be made without departing from the steps of the invention. Having described the presently preferred embodiments, it is to be understood that the invention may be otherwise embodied within the scope of the appended claims.

What is claimed is:

1. A mobile boration system configured to provide nuclear reactor systems with borated coolant that can mix components of the borated coolant on-site, to provide borated water, the mobile boration system comprising:
   a) a water source or a connection to a water source;
   b) a water soluble boron powder source;
   c) a heater to heat the water;
   d) a pump operable to provide a motive force to move water to a desired location;
   e) a metering system configured to provide a metered flow of the boron powder source and water heated by the heater;
   f) a mixer configured to provide metered mixing of the heated water and the water soluble boron source to provide a metered concentration of water/boric acid slurry;
   g) a dilution tank;
   h) a hot stream conduit connected between the mixer and the dilution tank, configured to convey the heated water/boric acid slurry to the dilution tank;
   i) a dilution stream conduit connecting an inlet port on the dilution tank to a cool dilution stream relative to the heated water/boric acid slurry;
   j) a diluted boric acid output connected to an exit port on the dilution tank for conveying a mixture of the dilution stream and the heated water/boric acid slurry to a nuclear reactor system;
   k) a transport arrangement configured to transport the mobile boration system to the nuclear reactor system, wherein the transport arrangement eliminates the need for onsite storage of conventionally large volumes of borated/boric acid water solutions; and
   l) an insulated chamber housing the mixer and a length of the hot stream conduit with the dilution tank outside of the insulated chamber.

2. The mobile boration system of claim 1, wherein the heater heats the water/boric acid slurry in the mixer.

3. The mobile boration system of claim 1, wherein the pump of (e) is selected from the group consisting of a positive displacement pump and a centrifugal pump with a flow meter.

4. The mobile boration system of claim 1, wherein the water soluble boron powder source is supplied by a hopper and a screw feed conveyor.

5. The mobile boration system of claim 1, wherein the mixer is a mechanical mixer which can provide sufficient agitation to ensure the slurry goes into solution with air entrainment of less than 1 vol. %.

6. The mobile boration system of claim 4, wherein the screw feed conveyor and the hopper can provide a controlled volume flow of the water soluble boron powder source.

7. The mobile boration system of claim 1, wherein the transport arrangement is selected from a truck trailer, a railcar flatbed, a sea transport or an air transport.

8. The mobile boration system of claim 1, including a tank containing a chemical additive, said additive facilitating dissolution of the water soluble boron powder source in the volume of water.

9. The mobile boration system of claim 1, wherein the water source is selected from the group consisting of pumped water or tank water.

10. The mobile boration system of claim 1 including an environmental control system for heating an inside of the insulated chamber.

11. The mobile boration system of claim 1 including a compressor connected to the dilution tank to supply compressed air to the upper interior of the dilution tank.

12. The mobile boration system of claim 1 including a control system which is responsive to an operator input of set points to automatically control a concentration of boric acid exiting the dilution tank.

13. The mobile boration system of claim 1 including an $H_2BO_3$ powder delivery system that includes a compressed air input that provides an air blanket to prevent powder agglomeration caused by moisture migration to the interface between the water soluble boron powder source and the mixer.

14. The mobile boration system of claim 13 wherein the mixer is maintained substantially at atmospheric pressure.

* * * * *